Figure 1:
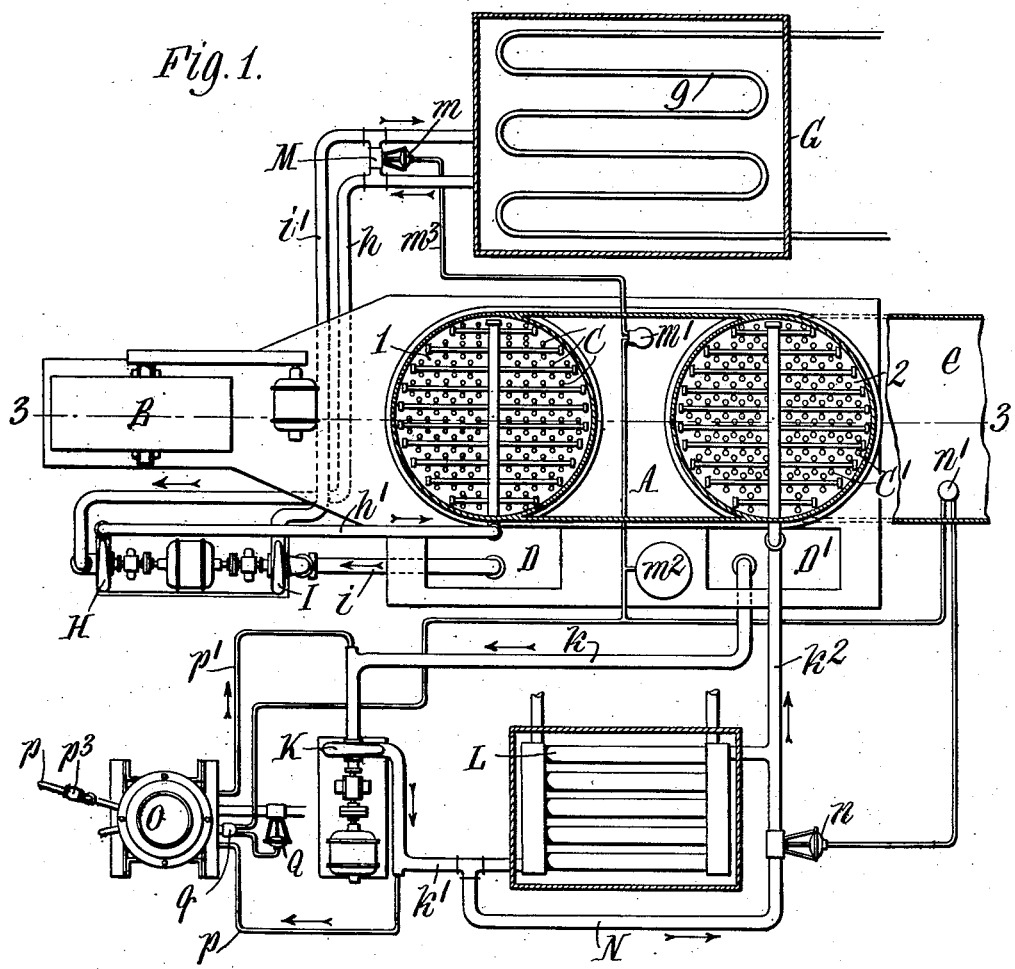

W. H. CARRIER.
METHOD FOR DEHUMIDIFYING AND COOLING AIR.
APPLICATION FILED AUG. 4, 1909.

1,172,429.

Patented Feb. 22, 1916.
2 SHEETS—SHEET 1.

Witnesses:
E. A. Volk
A. G. Dimond

Inventor
Willis H. Carrier
by Wilhelm Parker Hurd
Attorneys.

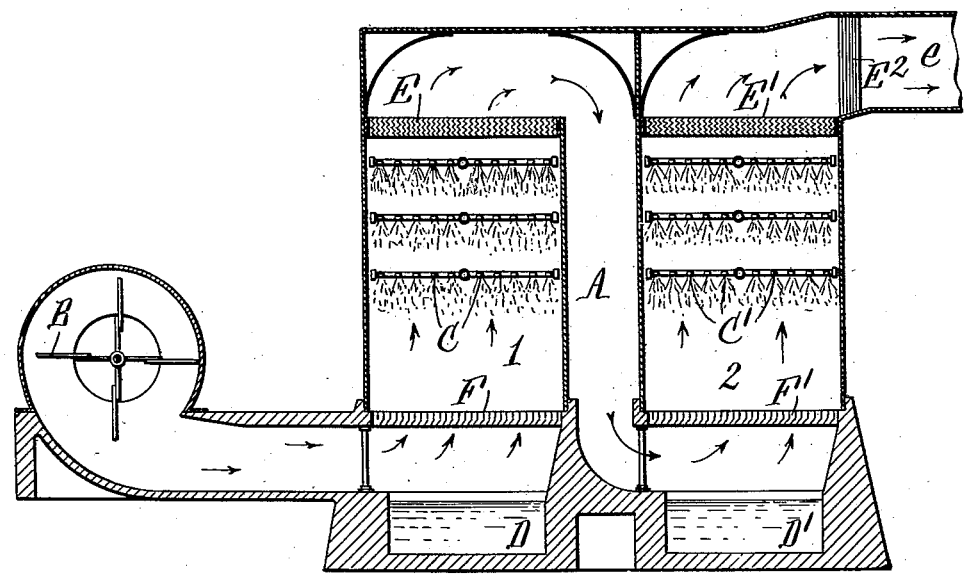

UNITED STATES PATENT OFFICE.

WILLIS H. CARRIER, OF BUFFALO, NEW YORK, ASSIGNOR TO BUFFALO FORGE COMPANY, OF BUFFALO, NEW YORK.

METHOD FOR DEHUMIDIFYING AND COOLING AIR.

1,172,429.

Specification of Letters Patent.

Patented Feb. 22, 1916.

Application filed August 4, 1909. Serial No. 511,117.

*To all whom it may concern:*

Be it known that I, WILLIS H. CARRIER, a citizen of the United States, residing at Buffalo, in the county of Erie and State of New York, have invented a new and useful Improvement in Methods for Dehumidifying and Cooling Air, of which the following is a specification.

This invention relates to a method of and apparatus for dehumidifying and cooling or refrigerating air. While the method and apparatus are primarily intended for supplying air having a predetermined low humidity for use in blast furnaces, they are not restricted to this use and can be employed for dehumidifying or refrigerating air for any purpose.

The primary object of the invention is to produce an efficient and economical method for dehumidifying and cooling air, and an automatic apparatus for carrying out said method which can be installed and maintained at a comparatively small expense.

Other objects of the invention are to dehumidify and cool air in successive stages by first subjecting it to a spray of relatively cold water to lower its temperature and humidity, and then subjecting this air, after the free moisture has been separated therefrom, to a spray of liquid, which is cooled to a temperature lower than that of the liquid first used, to further lower its temperature and absolute humidity; also to automatically regulate the temperature in the apparatus so as to obtain a predetermined temperature and humidity of the air after treatment, and preferably to do this in each stage so that the succeeding stage will always have a definite amount of work to perform; also to produce a practical and economical method and apparatus by which air can be obtained which contains less than the theoretical amount of moisture corresponding to the temperature to which it is cooled.

According to my method the air is preferably cooled in successive stages, being first subjected to a spray of relatively cold water which partially cools the air, and the free moisture then separated from the air, leaving it saturated at this temperature, after which the cooled air is sprayed in the second stage with a refrigerated liquid, such, for example, as calcium chlorid brine or other suitable nonfreezing liquid by which the temperature of the air is lowered to the desired temperature, and the free moisture and refrigerating solution are then separated from the air. If water or a non-hygroscopic liquid is used in the second stage the air will leave the apparatus completely saturated, the quantity of water vapor per cubic foot which it contains depending upon the exit temperature of the air, whereas if a moisture absorbing solution, such as calcium chlorid, is used, the percentage of humidity in the air leaving the apparatus will correspond definitely to the density of the solution employed, so that it is possible, by using a solution of the proper density, to reduce the actual moisture contents of the air considerably below the theoretical dew point. As the brine must, for the sake of economy and in order to produce uniform results, be used over and over, it is necessary to remove therefrom the moisture condensed from the air and this is accomplished by by-passing a portion of the brine through a condenser. Since at a fixed boiling point there is a corresponding fixed density of the brine, the required density of the brine is maintained, regardless of the density at which it enters the condenser, by automatically regulating the quantity of the brine concentrated and keeping a constant temperature in the condenser by thermostatic means. The cold weak brine on the way to the condenser and the hot concentrated brine leaving the condenser are preferably passed through a heat interchanger to warm the weak brine, and cool the concentrated brine to within a few degrees of the original temperature of the solution, whereby the cost of concentrating and again cooling the brine is materially lessened. Preferably the saturated air leaving the first stage is automatically kept substantially at a predetermined temperature, in order to equalize the work of the second stage, by regulating the temperature of the spray water by means controlled by a thermostat which is influenced by the saturated air, and the air leaving the apparatus is also preferably kept at a predetermined temperature so that the air supplied by the apparatus will have a predetermined fixed humidity by similarly regulating the temperature of the refrigerated liquid used in the second stage.

The invention is not, however, restricted to thus regulating the temperature in both stages, as the predetermined temperature of the air after treatment can be secured by automatically regulating the temperature in one or the other stage by means controlled by the final temperature of the air.

Figure 2:
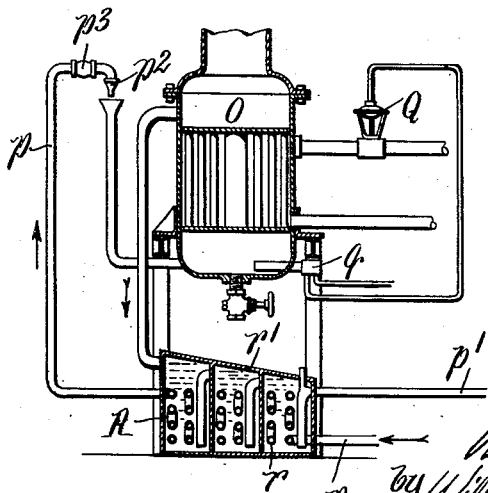

In the accompanying drawings, consisting of two sheets: Figure 1 is a diagrammatic plan view of an apparatus embodying the invention. Fig. 2 is a sectional elevation of the brine concentrator and heat interchanger. Fig. 3 is a fragmentary sectional elevation of the apparatus in line 3—3, Fig. 1. Like reference characters refer to like parts in the several figures.

1 and 2 represent spray chambers in which the successive stages of the cooling operation are performed. In the apparatus illustrated the air is dehumidified and cooled in two stages and two upright spray chambers or towers are employed, this being a desirable arrangement, but the invention is not limited to any particular number of stages or spray chambers, and it is also not limited to the upright arrangement of the spray chambers illustrated in the drawings, this number and arrangement of the spray chambers being illustrative of the invention.

The spray chambers are connected by an air passage A and air is caused to flow upwardly first through the chamber 1 and then through the chamber 2 by a fan blower B or other suitable means.

C and C′ represent spray nozzles in the chambers 1 and 2, respectively, of any suitable construction and arrangement adapted to fill the chambers with a fine spray so as to cause an intimate and thorough contact of the spray liquid with all portions of the air. The nozzles preferably direct the spray downwardly, or in a direction opposite to the flow of the air.

D D′ are settling tanks for the liquid in the bottoms of the spray chambers, and E and E′ are eliminators in the spray chambers above the spray nozzles for separating the free moisture or liquid from the air. A supplemental eliminator $E^2$ is preferably employed in the air discharge passage $e$ for the second or final spray chamber 2 to insure a complete separation of all the free moisture and spray liquid from the air before it leaves the apparatus. These eliminators may consist, as shown, of spaced zig-zag plates between which the air passes, or they may be of other suitable construction.

F and F′ represent diffusing plates in the spray chambers above their air admission openings for evenly distributing the air in the chambers.

The air is preferably sprayed with cold water in the first chamber 1 and with a solution of calcium chlorid or other non-freezing brine or liquid in the second chamber 2, both the water and calcium chlorid being preferably circulated through cooling devices and used over and over in the following manner: G represents a water cooling tank of any suitable sort provided with ammonia coils $g$ or other means for cooling the water. The water is taken from this tank through a pipe $h$ by a pump H and delivered under pressure through a pipe $h'$ to the spray nozzles C in the spray chamber 1, and the spray water and condensed moisture collecting in the settling tank D are returned to the cooling tank by a pump I and pipes $i$ and $i'$. K represents a pump which takes the brine by a pipe $k$ from the settling tank D′ of the second spray chamber and delivers it under pressure to the spray nozzles C′ in this chamber through pipes $k'$ and $k^2$ and double ammonia coils L by which the brine is refrigerated.

The invention is not restricted to any particular construction of the various devices described for spraying the air first with water then again with a refrigerated brine or non-freezing liquid, for separating the free moisture from the air, and for circulating and refrigerating the water and brine, and various different devices may be employed for performing these functions, the invention residing in the treating of the air in successive stages first with a spray of relatively cold water or liquid to partially lower its temperature and then with a spray of suitable liquid at a lower temperature to secure the final predetermined low temperature of the air.

The water is cooled in the cooler G to a temperature such that it will chill the air in the first spray chamber to a desired predetermined temperature, of say 40° or 45° F. For keeping this temperature constant in order to equalize the work of further refrigerating the air to the desired temperature in the second stage, the following means are shown: M represents a by-pass pipe which connects the water pipes $i'$ and $h$ leading to and from the water cooler and is provided with a valve $m$ controlled by a thermostat $m'$ which is located in the air passage A connecting the spray chambers, and regulates the flow of compressed air from a reservoir $m^2$ through a pipe $m^3$ for operating the by-pass valve $m$. The valve $m$ operates under the control of the thermostat to direct more or less of the water through the cooler G or the by-pass pipe M and thus vary the temperature of the water as may be necessary to maintain a predetermined temperature of the air leaving the first spray chamber. The air leaving the apparatus is preferably kept at a constant temperature to insure uniform results in a similar manner by regulating the temperature of the brine by causing more or less of it to flow through the ammonia coils L or through a by-pass pipe N around the coils which is provided with a valve $n$ controlled by a thermostat $n'$ located in the air discharge passage from the second spray chamber. Any other suitable means could be employed for thus causing the air to leave the spray chambers at predetermined temperatures.

The concentration of the calcium chlorid solution or brine to evaporate therefrom the water condensed from the air in order to keep the required density of the brine, is accomplished preferably in the following manner: O represents a brine evaporator or concentrator which is connected by pipes $p$ and $p'$ with the discharge and intake pipes $k'$ and $k$ of the brine-circulating pump K, so that a portion of the brine is continuously passed through the concentrator. A constant quantity of brine is preferably caused to flow continuously through the concentrator by providing the pipe $p$ with a constant pressure nozzle $p^2$ and an ordinary pressure regulating valve $p^3$, as shown in Fig. 2, or by other suitable means. The brine is heated in the concentrator shown by steam, and the supply of steam is regulated to maintain a uniform temperature in the concentrator by a valve Q in the steam supply pipe controlled by a thermostat $q$ located in the concentrator. Since at a fixed boiling point there is a corresponding fixed density of the brine, the means described enable the brine to be automatically concentrated to the required density regardless of the density of the brine entering the concentrator. R represents a heat interchanger of any suitable kind through which the cold weak brine on the way to the concentrator and the hot concentrated brine leaving the concentrator pass, whereby the former is preliminarily heated and the latter is cooled to within a few degrees of the original brine temperature, so that a considerable saving is effected in heating the brine to concentrate it and in again refrigerating it. In the interchanger illustrated the pipe $p$ leading the cold brine to the concentrator is provided with coils R located in a series of compartments in a tank $r'$ through which the hot concentrated brine passes in succession.

By spraying refrigerated liquid under pressure into the air a very intimate contact of the air and liquid is secured and it is possible to bring the temperature of the air very close to that of the liquid, which enables considerably higher ammonia temperatures and back pressures to be used in the refrigerating coils, and therefore permits the use of a smaller refrigerating apparatus and reduces the cost of operation. This manner of treating the air obviates the necessity for refrigerating coils or surfaces which become coated with ice, thereby greatly lessening their efficiency, as well as causing trouble in removing the ice. The cost of such coils, as well as the space required for them, is also saved, thus greatly reducing the size and initial cost of the apparatus. The apparatus is automatic in operation and requires very little attention.

By dividing the work of refrigerating the air into stages so that water can be used in one stage, and concentrating a small quantity of the brine to a maximum density in the manner described, the cost of operation is greatly reduced, and by the thermostatic control of the temperature of the air leaving each stage the work of the different stages is equalized and absolute uniformity of the moisture contents of the air is obtained. Furthermore, by dividing the work of refrigerating the air into successive stages (two or more) it is possible to obtain the required amount of refrigeration with much less expenditure of power than otherwise, because the first stage being at a much higher temperature than the succeeding stage or stages, permits the use of higher ammonia temperature and proportionately higher ammonia pressure in the first stage, which correspondingly increases the capacity of the ammonia compressor and decreases the amount of power required to obtain a unit of refrigeration. The cost of obtaining a unit of refrigeration in the first stage is very much less, approximately one-third less, than that of obtaining a unit in the second stage.

I claim as my invention:

1. The herein described method of dehumidifying air consisting in reducing the temperature of the air in successive stages by first bringing the air into direct contact with a finely divided substantially unobstructed spray of liquid of lower temperature than the air, and separating the free moisture from the air, then bringing the cooled air after the separation of the free moisture therefrom into direct contact with a finely divided substantially unobstructed spray of liquid which is refrigerated before contact with the air to a lower temperature than the liquid first used to further reduce the temperature of the air, and thereafter separating the free moisture from the air, substantially as set forth.

2. The herein described method of dehumidifying air consisting in reducing the temperature of the air in successive stages by first bringing the air into direct contact with a finely divided substantially unobstructed spray of a relatively cold liquid, and separating the free moisture from the air, then further reducing the temperature of the air after the separation of the free moisture therefrom by passing the air through a substantially unobstructed spray or shower of a non-freezing liquid which is refrigerated before contact with the air to a lower temperature than the liquid first used, and then separating the free moisture from the air, substantially as set forth.

3. The herein described method of dehumidifying air consisting in reducing the temperature of the air in successive stages by first bringing the air into direct contact with a substantially unobstructed spray of a relatively cold liquid, and separating the free moisture from the air, then bringing the cooled air after the separation of the free moisture therefrom into direct contact with a substantially unobstructed spray of a moisture absorbing liquid which is refrigerated before contact with the air to a lower temperature than the liquid first used to further reduce the temperature of the air, and then separating the free moisture from the air, said moisture absorbing liquid being circulated and used repeatedly, substantially as set forth.

4. The herein described method of dehumidifying air consisting in reducing the temperature of the air in successive stages by first bringing the air into direct contact with a substantially unobstructed spray of a liquid which is circulated and refrigerated before contact with the air to keep it at a suitable temperature lower than that of the air, and separating the free moisture from the air, then bringing the cooled air after the separation of the free moisture therefrom into direct contact with a substantially unobstructed spray of a liquid which is circulated and refrigerated before contact with the air to keep it at a suitable temperature lower than the temperature of the liquid first used whereby the temperature of the air is further reduced, and then separating the free moisture from the air, substantially as set forth.

5. The herein described method of dehumidifying air consisting in reducing the temperature of the air in successive stages by first bringing the air into direct contact with a spray of a relatively cold liquid and separating the free moisture from the air, then bringing the cooled air after the separation of the free moisture therefrom into direct contact with a spray of a liquid which is refrigerated before contact with the air to a temperature lower than that of the liquid first used to further reduce the temperature of the air, and regulating the temperature in at least one of the cooling stages under the control of the temperature of the air leaving such stage to give a substantially predetermined temperature of the air after treatment, substantially as set forth.

6. The herein described method of dehumidifying air consisting in reducing the temperature of the air in successive stages by first bringing the air into direct and intimate contact with a relatively cold liquid and separating the free moisture from the air, then bringing the air thus cooled after the separation of the free moisture therefrom into direct and intimate contact with a liquid which is refrigerated before contact with the air to a temperature lower than that of the liquid first used to further reduce the temperature of the air, and separating the free moisture from the air, the temperature in at least one of the cooling stages being regulated under the control of the temperature of the air leaving such stage to give substantially a predetermined temperature of the air after treatment in such stage, substantially as set forth.

7. The herein described method of dehumidifying air consisting in reducing the temperature of the air in successive stages by first causing a direct and intimate contact of the air with a relatively cold liquid and separating the free moisture from the air, then causing a direct and intimate contact of the air thus cooled after separating the free moisture therefrom with a liquid which is refrigerated before contact with the air to a temperature lower than that of the liquid first used to further reduce the temperature of the air and separate the free moisture from the air, the temperature in each stage being regulated to cause the saturation of the air in such stage substantially at a predetermined temperature, substantially as set forth.

8. The herein described method of dehumidifying air consisting in reducing the temperature of the air in successive stages by first bringing the air into direct contact with a spray of a refrigerated liquid and automatically regulating the temperature of said liquid to cause the saturation of the air substantially at a predetermined temperature, then separating the free moisture from the air, then bringing the air thus cooled and after the separation of the free moisture therefrom into direct contact with a spray of a circulating refrigerated liquid and automatically regulating the temperature of the liquid to cause the saturation of the air substantially at a predetermined temperature lower than the saturation temperature in the first stage, and then separating the free moisture from the air, substantially as set forth.

9. The herein described method of dehumidifying air consisting in reducing the air to successively lower temperatures in successive stages, the treatment of the air in one of said stages consisting in bringing the air into direct contact with a finely divided substantially unobstructed spray of a relatively cold liquid and separating the free moisture from the air, and regulating the temperature in such stage under the control of the temperature of the air after treatment to cause the saturation of the air in such stage substantially at a predetermined temperature, substantially as set forth.

10. The herein described method of regulating the humidity of air consisting in reducing the temperature of the air by first bringing the air into direct contact with a spray of a circulating liquid of lower temperature than the air, separating the free moisture from the air, passing at least a portion of said circulating liquid through a cooler, and maintaining a predetermined temperature of the air after contact with the liquid by automatically regulating the amount of liquid passing through the cooler by means controlled by the temperature of the air after contact with the liquid, substantially as set forth.

Witness my hand, this 2d day of August, 1909.

WILLIS H. CARRIER.

Witnesses:
C. W. PARKER,
C. B. HORNBECK.